United States Patent [19]

Morehouse et al.

[11] 3,867,420
[45] Feb. 18, 1975

[54] PARTIALLY CROSSLINKED SILOXANE-POLYOXYALKYLENE ( ≡ SIOC ≡ ) BLOCK COPOLYMER COMPOSITIONS AND USE THEREOF AS SURFACTANTS IN THE PRODUCTION OF POLYURETHANE FOAMS

[75] Inventors: Edward L. Morehouse, New City; Bela Prokai, Mahopac, both of N.Y.

[73] Assignee: Union Carbide Corporation, New York, N.Y.

[22] Filed: Oct. 19, 1970

[21] Appl. No.: 82,171

[52] U.S. Cl..........260/448.8 R, 260/2.5 AM, 260/2.5 AP, 260/2.5 EP, 260/2.5 P, 260/2.5 R, 260/46.5 R, 260/448.2 B
[51] Int. Cl. ............................................ C07f 7/18
[58] Field of Search ................. 260/448.8 R, 46.5 R

[56] References Cited
UNITED STATES PATENTS

| | | | |
|---|---|---|---|
| 3,170,984 | 2/1965 | Brown et al. | 260/448.8 R X |
| 3,230,185 | 1/1966 | Kopnick et al. | 260/448.8 R X |
| 3,272,762 | 9/1966 | Ibbotson et al. | 260/448.8 R X |
| 3,480,583 | 11/1969 | Bailey et al. | 260/46.5 R |
| 3,564,037 | 2/1971 | Delaval et al. | 260/448.8 R |

*Primary Examiner*—Paul F. Shaver
*Attorney, Agent, or Firm*—Eugene C. Trautlein

[57] ABSTRACT

Partially crosslinked siloxane-polyoxyalkylene block copolymer compositions having siloxane blocks linked to polyoxyalkylene blocks by silicon to oxygen to carbon ( ≡ SiOC ≡ ) linkages, the carbon of each said linkage being bonded only to the oxygen of said linkage, hydrogen and carbon. The siloxane blocks are comprised of siloxane units each having one to three monovalent hydrocarbon groups bonded to the silicon thereof and have an average of at least two valences of silicon per siloxane block combined in said linkages. A portion of the polyoxyalkylene blocks comprise oxyalkylene units and are crosslinking blocks having at least two valences of carbon per polyoxyalkylene block combined in said linkages joining separate siloxane blocks. The total of valences of silicon, combined in said linkages, of an average siloxane block plus the valences of carbon, combined in said linkages, of an average cross-linking polyoxyalkylene block is at least five. A portion of said polyoxyalkylene blocks are noncrosslinking or branching blocks having only one valence of carbon per block combined in said linkages, comprise oxyalkylene units and contain at least one of the groups of hydroxy, —OR, —OOCNHR, and —OOCR groups in which R is monovalent hydrocarbon having 1 to 18 carbon atoms. The ratio of the number of polyoxyalkylene blocks to said siloxane blocks is 3:1 to 100:1 and the average number of silicon valences per average siloxane block combined with said polyoxyalkylene blocks times the weight percentage of said siloxane blocks in the composition is 20 to 150.

8 Claims, No Drawings

PARTIALLY CROSSLINKED SILOXANE-POLYOXYALKYLENE (≡SiOC≡) BLOCK COPOLYMER COMPOSITIONS AND USE THEREOF AS SURFACTANTS IN THE PRODUCTION OF POLYURETHANE FOAMS

The partially crosslinked copolymer compositions are useful in the manufacture of polyurethane foams as a foam stabilizer or as a combined foam stabilizer and active hydrogen reactant, by using a chemical blowing agent and/or by dispersing therein an inert normally gaseous material such as air. They are also useful as emulsifiers and wetting agents.

This invention relates to novel surfactant compositions which are especially useful as stabilizers in the manufacture of polyurethane foams. More particularly, this invention relates to siloxane-polyoxyalkylene block copolymers which are partially crosslinked to a controlled extent.

Many siloxane-polyoxyalkylene block copolymers are known in the prior art. For example, U.S. Pat. Nos. 3,218,344 and 2,868,824 disclose either branched (i.e., uncrosslinked) or extremely highly crosslinked block copolymers in which the siloxane blocks and polyoxyalkylene blocks are connected by ≡SiC≡ linkages. U.S. Pat. Nos. 2,846,458; 3,234,252, 3,246,048 and Re 25,727 disclose block copolymers in which the siloxane blocks and polyoxyalkylene blocks are connected by ≡SiC≡ linkages and which are not substantially crosslinked. U.S. Pat. Nos. 2,834,748 and 2,917,480 and British Patent No. 954,041 disclose block copolymers in which the siloxane blocks are joined by ≡SiOC≡ linkages and which are not substantially crosslinked. U.S. Pat. No. 3,190,903 discloses branched block copolymers in which the siloxane blocks are joined to polyoxyalkylene blocks by ≡SiOC≡ linkages. U.S. Pat. No. 3,384,599 discloses siloxane-polyoxyalkylene block copolymers made with such a huge amount of polyoxyalkylene polyol that substantially no crosslinking results in the copolymer. The resulting product is used as an active hydrogen containing reactant in the formation of polyurethanes.

It has now been found that siloxane-polyoxyalkylene block copolymers which are partially crosslinked within controlled limits relative to siloxane content and which contain controlled proportions of siloxane blocks and polyoxyalkylene blocks possess uniquely advantageous properties not found in previously known block copolymers. As an example, the previously known block copolymers as a class are not especially effective as stabilizers for producing curable, polyurethane-forming froths, whereas the novel block copolymers of this invention are excellent stabilizers for such purposes and provide froths which have excellent structural stability and which are workable at ambient conditions.

The novel compositions of this invention comprise partially crosslinked siloxane-polyoxyalkylene block copolymers in which the polyoxyalkylene blocks are linked to the siloxane blocks by silicon to oxygen to carbon ≡SiOC≡ linkages. The siloxane blocks are comprised of siloxane units each having one to three monovalent hydrocarbon groups bonded to the silicon thereof and have an average of at least two valences of silicon per siloxane block combined in the ≡SiOC≡ linkages. A portion of the polyoxyalkylene blocks comprise oxyalkylene units and are crosslinking blocks having at least two valences of carbon per polyoxyalkylene block combined in the ≡SiOC≡ linkages joining separate siloxane blocks. The total of valences of silicon, combined in the ≡SiOC≡ linkages, of an average siloxane block plus the valences of carbon, combined in the ≡SiOC≡ linkages, of an average crosslinking polyoxyalkylene block is at least five. The polyoxyalkylene block is preferably composed of carbon, hydrogen and oxygen, preferably etheric oxygen only, but can contain other elements such as, nitrogen, phosphorus and/or carbonyl oxygen.

A portion of the polyoxyalkylene blocks are noncrosslinking or branching blocks having only one valence of carbon per noncrosslinking block combined in said linkages, comprise oxyalkylene units and contain at least one group selected from the class consisting of hydroxy, —OR, —OOCNHR, and —OOCR groups wherein R is monovalent hydrocarbon having 1 to 18 carbon atoms. The average number of the silicon valences per average siloxane block combined with polyoxyalkylene blocks times the weight percentage of siloxane blocks in the composition, based on the total weight of siloxane blocks and polyoxyalkylene blocks in the composition, equals about 20 to about 150, preferably about 25 to about 75, and the ratio of the number of polyoxyalkylene blocks to siloxane blocks is about 3:1 to about 100:1, preferably about 3:1 to about 15:1.

The novel compositions, thus, include copolymers having siloxane blocks of the formula:

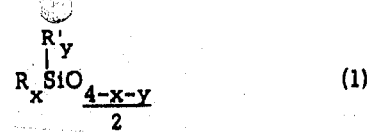
(1)

wherein R is a monovalent hydrocarbon group free of aliphatic unsaturation and having 1 to 18, preferably 1 to 6, carbon atoms, R' is oxygen bonding silicon of the siloxane block to carbon of the polyoxyalkylene block, $x$ is an integer of 1 to 3 inclusive, $y$ is an integer of 0 to 2 inclusive, and $x+y$ is an integer of 1 to 3 inclusive and each siloxane block has an average of at least two R' groups per block. Typical R groups include methyl, ethyl, propyl, butyl, pentyl, hexyl, stearyl, cyclopentyl, cyclohexyl, phenyl, benzyl, phenylethyl, tolyl, xylyl, naphthyl, anthryl, and the like.

As an illustration, the crosslinking polyoxyalkylene blocks of the copolymers of the novel compositions typically can include blocks of the formula:

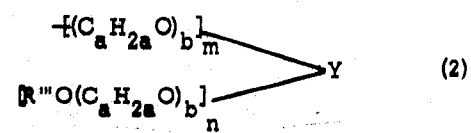
(2)

wherein Y is a polyvalent hydrocarbon group free of aliphatic unsaturation and has 2 to 18 carbon atoms and a valence of $m+n$, R''' is selected from the class consisting of hydrogen, RNHCO—, RCO— and R, $a$ is an integer of at least 2, preferably 2 to 4, $b$ is an integer of at least 1, for example, 1 to 200, preferably 5 to 100, $m$ is an integer of at least 2, for example 2 to 12, preferably 2 to 4, $n$ is 0 or a positive integer, for example, 0 to 12, preferably 0 to 3, and $m+n$ is an integer of 2 to 12, preferably 2 to 6. R''' is preferably free of aliphatic unsaturation and contains 1 to 18 carbon atoms. Typical R''' radicals include hydrogen, monovalent hydrocarbon groups as listed above as typical for R, acyl groups such as, acetyl, propionyl, butyryl, decanoyl, lauroyl, stearoyl and the like, and RNHCO— groups, such as, $CH_3NHCO—$, $C_3H_7NHCO—$, $C_{10}H_{21}NHCO—$, $C_{16}H_{33}NHCO—$, $C_{18}H_{37}NHCO—$ and the like.

Typical Y groups include divalent groups, such as, ethylene, 1,3-propylene, 1,2-propylene, 1,4-butylene, 1,3-butylene, 1,5-pentylene, 1,4-pentylene, and 1,6-hexylene, cycloalkylene including cyclohexylene, cyclopentylene, and the like, arylene including phenylene, tolylene, xylylene, naphthylene, $—C_6H_4CH_2C_6H_4—$, benzylidene, 5,6-dimethyl-1,3-phenylene, 2,4-dimethyl-1,3-phenylene, anthrylene, and the like; trivalent groups, such as, glyceryl,

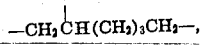

$CH_3C(CH_2—)_3$, $CH_3CH_2C(CH_2—)_3$, and the like; and other polyvalent groups, such as,

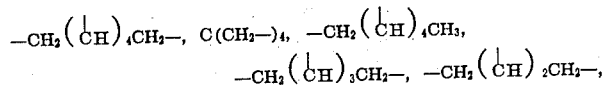

and the like. Typical oxyalkylene units $(C_aH_{2a}O)$ include 1,2-oxyethylene units, 1,2-oxypropylene units, 1,2-oxybutylene units and the like. The oxyalkylene chains, $+C_aH_{2a}O+_b$, each can comprise oxyalkylene units of one kind only (i.e., a is the same throughout the chain) or can contain two or more different kinds of oxyalkylene units, in which case it is a mixed oxyalkylene chain (i.e., a is not the same throughout the chain). In the case of mixed oxyalkylene chains, the different oxyalkylene units can be randomly distributed throughout the chain or the oxyalkylene units of the same kind can be disposed in one or more blocks in the chain.

It is readily apparent from formula (2) that, when Y is alkylene such as $—C_aH_{2a}—$, and m is 2 and g is 0, the crosslinking polyoxyalkylene block can be simply represented by the formula, $+C_aH_{2a}O)_bC_aH_{2a}—$, wherein a and b are as above-described.

The remaining polyoxyalkylene blocks, i.e., the non-crosslinking or branching blocks include, for example, polyoxyalkylene blocks of the formula:

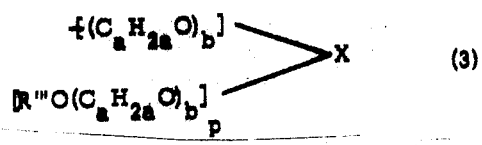

wherein X is a polyvalent hydrocarbon group as illustrated above for Y and has a valence of p+1. R''', a and b are as defined above and p is an integer of at least 1, for example 1 to 11, preferably 1 to 5. Typical oxyalkylene units, $C_aH_{2a}O$, include those specified above for formula (2) hereinabove and the oxyalkylene chains can comprise units of one kind only or of two or more different kinds distributed in blocks or randomly distributed as explained hereinabove in regard to formula (2). It is readily apparent in formula (3) that, when X is alkylene, $—C_aH_{2a}—$, and p is 1 the branching block can be simply represented by the formula:

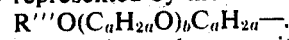

Particularly preferred novel compositions are those containing siloxane blocks of the formula:

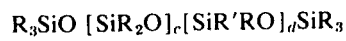

wherein R and R' are as defined above and c is an integer of 0 to 400, preferably 1 to 100, and d is an integer of 2 to 100, preferably 2 to 50. Especially preferred are those compositions containing units of formula (4) wherein R is methyl.

Particularly preferred compositions also contain crosslinking polyoxyalkylene blocks of the formula (2) wherein m+n is 3, Y is glyceryl,

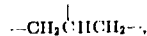

and R''' is hydrogen or —OCNHR, preferably hydrogen. Particularly preferred compositions also contain branching blocks of formula (3) wherein p is 2, X is glyceryl,

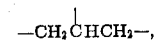

and R''' is hydrogen or —OCNHR, preferably hydrogen.

An example of a convenient manner in which the novel compositions described above can be prepared involves the reaction of controlled amounts as explained more fully hereinafter of a hydrosiloxane,

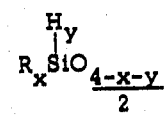

wherein R, x and y are as defined above, and a polyol such as a polyoxyalkylene polyol,

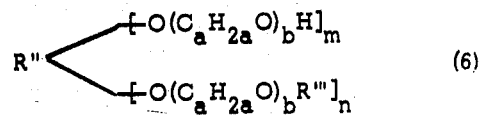

wherein R''', a, b, m and n are as defined above and R'' is a polyvalent hydrocarbon group as illustrated above for Y and X and has a valence of m+n. In the reaction, a hydroxyl group of the polyol reacts with a silicon bonded hydrogen group of the hydrosiloxane to form the ≡SiOC≡ bond joining the polyol molecule and the siloxane molecule and hydrogen, $H_2$. Crosslinking occurs when a single polyol molecule reacts with more than two siloxane molecules or when a single siloxane molecule reacts with more than two polyol molecules.

The hydrosiloxanes are readily available materials and can be prepared by standard procedures. Suitable hydrosiloxane include those having formula (5) above and preferably have the formula:

Especially preferred hydrosiloxanes are those of formula (7) in which R is methyl.

The polyol, e.g., polyoxyalkylene polyol, reactants are readily available materials or can be readily obtained by the addition reaction of an alkylene oxide, such as, ethylene oxide, 1,2-propylene oxide, 1,2-butylene oxide and the like or mixtures thereof to a hydroxyl containing organic compound, such as, water, ethylene glycol, 1,2-propylene glycol, dipropylene glycol, glycerol, pentaerithritol, sorbitol, and other polyols as hereinafter illustrated, under conditions conventionally used to produce polyoxyalkylene polyols.

Any of the polyols or polyhydroxy compounds hereinafter described can comprise the polyol reactant. Suitable polyhydroxy compounds have hydroxyl numbers of about 20 or lower to about 1000 or higher, preferably from about 30 to about 600, and should contain an average of two or more carbon-bonded hydroxyl groups per molecule.

The molar ratio of polyoxyalkylene polyol to hydrosiloxane used in the reaction mixture is in the range of about 3:1 to about 100:1, preferably about 3:1 to about 15:1. The amounts of polyol and hydrosiloxane reactants in the reaction mixture also are so proportioned that the average number of silicon-bonded hydrogen atoms per hydrosiloxane molecule times the weight percentage of hydrosiloxane in the reaction mixture, based on the total weight of hydrosiloxane and polyol in the reaction mixture, equals about 20 to about 150, preferably about 25 to about 75.

In general, the reaction can be conducted employing about 0.05 or less to about 1.0 percent or more by weight of the reactants of a suitable catalyst, such as, stannous octoate, dibutyltin dilaurate, stannous oleate, and other tin compounds, platinum compounds such as chloroplatinic acid and the like. If desired, the catalyst can be dissolved in a suitable solvent, such as, tetrahydrofuran, ethanol, butanol or a mixture of ethanol and ethylene glycol dimethyl ether, or the platinum catalyst can be in the form of finely divided elemental platinum supported on a material such as gamma alumina or charcoal. The reaction can be conducted at a temperature of from 60°C. to 200°C., or preferably at a temperature from about 100°C. to about 140°C. It is preferred to conduct the reaction in the presence of a liquid organic compound or solvent in which the reactants are mutually soluble. Solvents are especially preferred in the reaction so as to provide greater compatibility between the reactants. Suitable solvents preferably do not contain active hydrogen and include aromatic hydrocarbons (e.g., toluene and xylene) and ethers and polyethers (e.g., ethylene glycol diethyl ether, diethylene glycol dimethyl ether, diisopropyl ether, and dipropyl ether). Such solvents can be employed in an amount from 10 parts to 1,000 parts by weight per 100 parts by weight of the reactants.

For reactions of hydrosiloxanes with polyols to form the copolymers of this invention the siloxane may be added to the polyol in increments. Optionally, in those cases where exotherms are not great, hydrosiloxane and polyol may be mixed together and maintained at a temperature at which the rate of reaction is satisfactory. Inasmuch as hydroxyl, not ≡SiH groups must be in excess, the polyol should not be added to the hydrosiloxane. Additions of the polyol to the hydrosiloxane, for example, might result in gels before complete reaction of SiH. Additional amounts of catalyst can be added during the reaction to maintain an adequate rate of reaction.

After the reaction of the hydrosiloxane and polyol has been completed, the resulting novel block copolymer composition can be used as it is, after removal of solvent and low boiling materials as by sparging, or, if desired, unreacted hydroxyl groups, if any, in the block copolymer can be further reacted with a monoisocyanate such as methyl isocyanate or it can be etherified or esterified using conventional techniques. For example, the hydroxyl groups can be capped with methyl isocyanate in the presence of stannous octoate catalyst and toluene as solvent at a temperature in the range of 25° to 40°C., without disruption of the crosslinked structures of the novel compositions.

The novel partially crosslinked siloxane-polyoxyalkylene block copolymers of this invention are useful as foam stabilizers in the manufacture of polyurethane foams, epoxy foams and polyvinyl chloride foams by mechanical frothing techniques. For example, curable, polyurethane-forming froths which are substantially structurally stable but workable at ambient temperatures are formed by dispersing (by whipping or beating) an inert gas, such as air, throughout a mixture containing an active hydrogen compound containing an average of at least two active hydrogen atoms per molecule; a foam stabilizing amount of the novel block copolymer; a polyisocyanate having at least two isocyanato groups per molecule reactive with said active hydrogen atoms, said polyisocyanate and active hydrogen compound being present in the mixture in major amounts and in relative amounts required to produce the polyurethane; and a catalytic amount of a catalyst for the reaction of the active hydrogen compound and the polyisocyanate to produce the polyurethane.

The amount of the novel block copolymer surfactant employed as a foam stabilizer in this invention can vary over wide ranges, e.g., from about 0.5 weight parts to 10 weight parts or greater, per hundred weight parts of the active hydrogen component. There is no commensurate advantage to using amounts of surfactant less than 0.5 or greater than about 10 weight parts on the same basis. Preferably, the amount of surfactant present in the foam formulations varies from about 1.0 weight part to about 6.0 weight parts on the same basis.

The polyisocyanate components employed in the abovedescribed crosslinking reaction and for mixing with active hydrogen compounds to form the liquid phase of the novel froths preferably are those having the general formula:

$$Q(NCO)_i$$

wherein $i$ is an integer of two or more and Q is an organic radical having the valence of $i$. Q can be substituted or unsubstituted hydrocarbon group (e.g., an alkylene or an arylene group). Q can be a group having the formula Q'—Z—Q' where Q' is an alkylene or arylene group and Z is —O—, —O—Q'—, —CO—, —S—, —S—Q'—S—, or —SO$_2$—. Examples of such compounds include hexamethylene diisocyanate, 1,8-diisocyanato-p-menthane, xylylene diisocyanate, (OCNCH$_2$—CH$_2$CH$_2$OCH$_2$)$_2$O, 1-methyl-2,4-diisocyanatocyclohexane, phenylene diisocyanates, tolylene diisocyanates, chlorophenylene diisocyanates, diphenylmethane-4,4'-diisocyanate, naphthalene-1,5-diisocyanate, triphenylmethane-4,4',4''-triisocyanate, and isopropylbenzene-alpha-4-diisocyanate.

Q can also represent a polyurethane radical having a valence of $i$ in which case Q(NCO)$_i$ is a composition conventionally known as a prepolymer. Such prepolymers are formed by reacting a stoichiometric excess of a polyisocyanate as set forth hereinbefore and hereinafter with an active hydrogen-containing component as set forth hereinafter, especially the polyhydroxyl-containing materials or polyols described below. Usually, for example, the polyisocyanate is employed in proportions of from about 30 percent to about 200 percent stoichiometric excess, the stoichiometry being based upon equivalents of isocyanate group per equivalent of hydroxyl in the polyol.

Further included among the isocyanates useful in this invention are dimers and trimers of isocyanates and diisocyanates and polymeric diisocyanates such as those having the general formula:

$$[Q''(NCO)_i]_j$$

in which $i$ and $j$ are each integers of two or more, and $Q''$ is a polyfunctional organic radical, and/or, as additional components in the mixtures, compounds of the general formula:

$$L(NCO)_i$$

in which $i$ is one or more and L is a monofunctional or polyfunctional atom or radical. Examples of this type include ethylphosphonic diisocyanate, $C_2H_5P(O)(NCO)_2$; phenylphosphonic diisocyanate, $C_6H_5P(O)(NCO)_2$; isocyanates derived from sulfonamides ($QSO_2NCO$), cyanic acid, and thiocyanic acid.

More specifically, the polyisocyanate component employed in the polyurethane-forming froths of this invention also include the following specific compounds as well as mixtures of two or more of them: 2,4-tolylene diisocyanate, 2,6-tolylene diisocyanate, crude tolylene diisocyanate, bis(4-isocyanatophenyl)methane, polyphenylmethylene polyisocyanates that are produced by phosgenation of anilineformaldehyde condensation products, dianisidine diisocyanate, toluidine diisocyanate, xylylene diisocyanate, bis(2-isocyanatoethyl) fumarate, bis(2-isocyanatoethyl) carbonate, 1,6-hexamethylenediisocyanate, 1,4-tetramethylenediisocyanate, 1,10-decamethylenediisocyanate, cumene-2,4-diisocyanate, 4-methoxy-1,3-phenylenediisocyanate, 4-chloro-1,3-phenylenediisocyanate, 4-bromo-1,3-phenylenediisocyanate, 4-ethoxy-1,3-phenylenediisocyanate, 2,4'-diisocyanatodiphenylether, 5,6-dimethyl-1,3-phenylenediisocyanate 2,4-dimethyl-1,3-phenylenediisocyanate, 4,4'-diisocyanatodiphenylether, bis 5,6-(2-isocyanatoethyl)bicyclo[2.2.1]hept-2-ene, benzidinediisocyanate, 4,6-dimethyl-1,3-phenylenediisocyanate, 9,10-anthracenediisocyanate, 4,4'-diisocyanatodibenzyl, 3,3-dimethyl-4,4'-diisocyanatodiphenylmethane, 2,6-dimethyl-4,4'-diisocyanatodiphenyl, 2,4-diisocyanatostilbene, 3,3'-dimethyl-4,4'-diisocyanatodiphenyl, 3,3'-dimethoxy-4,4'-diisocyanatodiphenyl, 1,4-anthracenediisocyanate, 2,5-fluorenediisocyanate, 1,8-naphthalenediisocyanate, 2,6-diisocyanatobenzfuran, 2,4,6-toluenetriisocyanate, and many other organic polyisocyanates that are known in the art, such as those that are disclosed in an article by Siefken, Ann., 562, 75 (1949). In general, the aromatic polyisocyanates are preferred because of their greater reactivity.

It is also of considerable advantage to block the isocyanate groups of the polyisocyanates listed above with a monofunctional organic compound such as a phenol as described in Annalen, Volume 262, pages 205 to 229; Reinhold plastics Applications Series on Polyurethanes by Bernard A Dombrow, published by Reinhold Publishing Corporation, New York, 1957; and Polyurethanes: Chemistry and Technology I. Chemistry by Saunders & Frisch, pages 118 to 121, published by Interscience in 1963. Blocking techniques permit the use of the more highly reactive polyisocyanates and/or to adjust the polymerizing or curing temperature of the froth. One or any number of the isocyanate groups in the polyisocyanate molecule can be blocked to provide the degree of reactivity desired. In addition, catalysts such as those described in Bunge U.S. Pat. No. 2,886,555 can be employed to adjust the splitting or unblocking temperature to that desired.

The amount of polyisocyanate employed will vary slightly depending upon the nature of the polyurethane being prepared. In general, the total -NCO equivalent to total active hydrogen equivalent should be such as to provide a ratio of 0.8 to 2.0 equivalents of —NCO per equivalent of active hydrogen, e.g., hydroxyl hydrogen, of the active hydrogen reactant, and preferably a ratio of about 1.0 to 1.5 equivalents of —NCO per active hydrogen.

The active hydrogen-containing component includes polyhydroxyl-containing materials, such as, the hydroxyl-terminated polyhydrocarbons (U.S. Pat. No. 2,877,212); hydroxyl-terminated polyformals (U.S. Pat. No. 2,870,097); fatty acid triglycerides (U.S. Pat. Nos. 2,833,730 and 2,787,601); hydroxyl-terminated polyesters (U.S. Pat. Nos. 2,698,838, 2,921,915, 2,591,884, 2,866,762, 2,850,476, 2,602,783, 2,729,618, 2,779,689, 2,811,493, and 2,621,166); hydroxymethyl-terminated perfluoromethylenes (U.S. Pat. Nos. 2,911,390 and 2,902,473); polyalkyleneether glycols (U.S. Pat. No. 2,808,991); British Pat. No. 733,624); polyalkylenearyleneether glycols (U.S. Pat. No. 2,808,391); polyalkyleneether triols (U.S. Pat. No. 2,866,774).

Especially preferred polyhydroxyl-containing materials are the polyether polyols obtained by the chemical addition of alkylene oxides, such as, ethylene oxide, propylene oxide and mixtures thereof, to water or polyhydric organic compounds, such as, ethylene glycol, propylene glycol, trimethylene glycol, 1,2-butylene glycol, 1,3-butanediol, 1,4-butanediol, 1,5-pentanediol, 1,2-hexylene glycol, 1,10-decanediol, 1,2-cyclohexanediol, 2-butene-1,4-diol, 3, cyclohexene-1,1-dimethanol, 4-methyl-3-cyclohexene-1, 1-dimethanol, 3-methylene-1,5-pentanediol, diethylene glycol (2-hydroxyethoxy)-1-propanol, 4-(2-hydroxyethoxy)-1-butanol, 5-(2-hydroxypropoxy)-1-pentanol, 1-(2-hydroxymethoxy)-2-hexanol, 1-(2-hydroxypropoxy)-2-octanol, 3-allyloxy -1,5-pentanediol, 2-allyloxymethyl-2-methyl-1,3-propanediol, [4,4-pentyloxy)methyl]-1,3-propanediol, 3-(o-propenylphenoxy)1,2-propanediol, 2,2'-diisopropylidenebis(p-phenyleneoxy)diethanol glycerol, 1,2,6-hexanetriol, 1,1,1-trimethylolethane, 1,1,1-trimethylolpropane, 3-(2-hydroxyethoxy)-1,2-propanediol, 3-(2-hydroxypropoxy)-1,2-propanediol, 2,4-dimethyl-2-(2-hydroxyethoxy)-methylpentanediol-1,5; 1,1,1-tris[2-hydroxyethoxy)methyl]ethane, 1,1,1-tris](2-hydroxypropoxy)-methyl]propane, diethylene glycol, dipropylene glycol, pentaerythritol, sorbitol, sucrose, lactose, alphamethylglucoside, alpha-hydroxyalkylglucoside, novolac resins, phosphoric acid, benzenephosphoric acid, polyphosphoric acids such as tripolyphosphoric acid and tetrapolyphosphoric acid, ternary condensation products, caprolactone and the like. The alkylene oxides employed in producing polyoxyalkylene polyols normally have from 2 to 4 carbon atoms. Propylene oxide and mixtures of propylene oxide with ethylene oxide are preferred. The polyols listed above can be used per se as the active hydrogen compound.

A preferred class of polyether polyols employed in this invention can be represented generally by the following formula

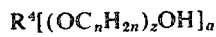

wherein $R^4$ is hydrogen or a polyvalent hydrocarbon radical; $a$ is an integer (e.g., 1 or 2 to 6 to 8) equal to the valence of R, $n$ in each occurrence is an integer from 2 to 4 inclusive (preferably 3) and $z$ in each occurrence is an integer having a value of from 2 to about 200, preferably from 15 to about 100.

Additional active hydrogen-containing materials are the polymers of cyclic esters having a reduced viscosity value of at least about 0.15, and desirably from about 0.2 to about 15, and higher. The preferred polymers of cyclic esters have a reduced viscosity value of from about 0.3 to about 10. These polymers are homopolymers or copolymers characterized as containing units of the formula:

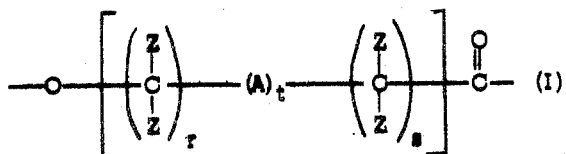

wherein each Z, individually, is hydrogen, alkyl, halo, or alkoxy; wherein A is the oxy group, wherein $r$ is an integer from 1 to 4; wherein $s$ is an integer from 1 to 4; wherein $t$ is an integer of zero or one; the sum of $r+s+t$ is at least 2 and not greater than 6; and the total number of Z groups which are substituents other than hydrogen does not exceed 3, preferably does not exceed 2. Illustrative Z groups include methyl, ethyl, isopropyl, n-butyl, sec-butyl, t-butyl, hexyl, chloro, bromo, iodo, methoxy, ethoxy, n-butoxy, nhexoxy, 2-ethyl-hexoxy, dodecoxy, and the like. It is preferred that each Z, individually, be hydrogen, lower alkyl, e.g., methyl, ethyl, n-propyl, isobutyl, and/or lower alkoxy, e.g., methoxy, ethoxy, propoxy, n-butoxy, and the like. It is further preferred that the total number of carbon atoms in the R substituents does not exceed eight.

In one embodiment, preferred polymers of cyclic esters contain both recurring structural Unit I and units of the formula:

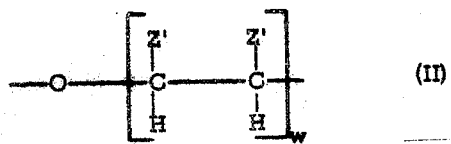

wherein each Z', individually, is hydrogen, alkyl, cycloalkyl, aryl, or chloroalkyl, or in which the two Z' variables together with the ethylene moiety of the oxyethylene chain of Unit II form a saturated cycloaliphatic hydrocarbon ring having from 4 to 8 carbon atoms, desirably from 5 to 6 carbon atoms and w is an integer of 1 or more, preferably 1 to 10. It is preferred that recurring Unit II contain from 2 to 12 carbon atoms. Illustrative Z' variables include methyl, ethyl, n-propyl, isopropyl, t-butyl, the hexyls, the dodecyls, 2-chloroethyl, phenyl, phenethyl, ethylphenyl, cyclopentyl, cyclohexyl, cycloheptyl, and the like. It is preferred that Z' be hydrogen; lower alkyl, e.g., methyl, ethyl, n-propyl, isopropyl; chloroalkyl, e.g., 2-chloroethyl; and the like.

The aforedescribed recurring Unit (I) is interconnected through the oxy group (-O-) of one unit with the carbonyl

of a second unit, i.e., the interconnection does not involve the direct bonding of two carbonyl groups

On the other hand, the relatively low molecular weight cyclic ester polymers, e.g., those having reduced viscosity values below about 0.3 are characterized by end groups which can be hydroxyl or carboxyl. Cyclic ester polymers having an average molecular weight of about 500 to about 2,000 are preferred for use herein.

The preparation of the cyclic ester polymers is well documented in the patent literature as exemplified by U.S. Pat. Nos. 3,021,309 through 3,021,317; 3,169,945; and 2,962,524. Briefly, the process involves the polymerization of a mixture containing at least one cyclic ester monomer with or without a functional initiator therefor such as the polyols described hereinbefore and in the patents mentioned above, and a suitable catalyst, the choice of which will depend on the presence or absence of an initiator. Suitable cyclic ester monomers which can be employed in the manufacture of the cyclic ester polymers are best illustrated by the following formula:

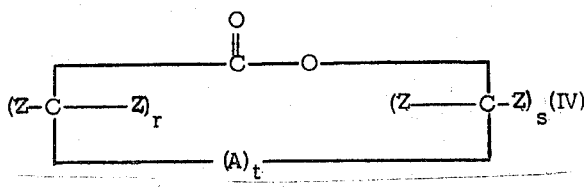

wherein the Z, A, $r$, $s$, and $t$ variables have the significance noted in Unit I supra. Representative cyclic ester monomers which are contemplated include, for example, delta-valerolactone; epsilon-caprolactone, zeta-enantholactone; the monoalkyl-delta-valerolactones, e.g., the monomethyl-, monoethyl-, monohexyl-, delta-valerolactones, and the like. In the absence of added functional initiator, the polymerization process is desirably effected under the operative conditions and, as noted in U.S. Pat. Nos. 3,021,309 through 3,021,317, in the presence of anionic catalysts. When reacting a mixture containing cyclic ester monomer and functional initiator which possesses at least one active hydrogen substituent, e.g., carboxyl or hydroxyl, it is desirable to use the catalysts noted in U.S. Pat. Nos. 2,878,236, 2,890,208, 3,169,945 and 3,284,417, under the operative conditions discussed therein. Suitable polyol initiators and polycarboxylic acid initiators are those listed in U.S. Pat. No. 3,169,945 and others of the patents enumerated herein as well as those polyols and polycarboxylic compounds listed hereinbefore.

Polymers of cyclic esters can also be manufactured via the process described in U.S. Pat. No. 2,962,524.

Cyclic ester/alkylene oxide copolymers also can be prepared by reacting a mixture comprising cyclic ester anad alkylene oxide monomers, an interfacial agent such as a solid, relatively high molecular weight poly(-vinyl stearate) or lauryl methacrylate/vinyl chloride copolymer (reduced viscosity in cyclohexanone at 30°C. of from about 0.3 to about 1.0), in the presence of an inert normally liquid saturated aliphatic hydrocarbon vehicle such as heptane and phosphorus pentafluoride as the catalyst therefor, at an elevated temperature, e.g., about 80°C. and for a period of time sufficient to produce such cyclic ester/alkylene oxide copolymers.

When the cyclic ester polymers are prepared from a mixture containing the cyclic ester monomer and minor amounts of a cyclic comonomer which is copolymeriable therewith, e.g., cyclic carbonates and cyclic ethers, such as, alkylene oxide, oxetane, tetrahydrofuran, etc., the polymeric chain of the resulting copolymeric product will be characterized by both recurring linear Unit I supra as well as the recurring linear Unit II (which would represent the alkylene oxide comonomer polymerized therein) and/or by a recurring linear unit which would correspond to the additional polymerizable cyclic comonomer in the monomeric mixture. When the comonomer is an alkylene oxide, the resulting copolymeric product will contain both recurring linear Unit I and recurring linear Unit II in the copolymeric chain thereof. The interconnection of linear Unit I and linear Unit II supra does not involve or result in the direct bonding of two oxy groups, i.e., —O—O—. In other words, the oxy group (—O—) or recurring linear Unit II is interconnected with the carbonyl group

of recurring linear Unit I supra or with the alkylene moiety of a second oxyalkylene Unit (II).

Polymers of cyclic esters as described above are useful in producing polyurethane articles having comparatively high strength and elongation.

As mentioned previously, the polymers of cyclic esters which are contemplated are expressed in terms of their reduced viscosity values. As is well known in the art, reduced viscosity value is a measure or indication of the molecular weight of polymers. The expression "reduced viscosity" is a value obtained by dividing the specific viscosity by the concentration of polymer in the solution, the concentration being measured in grams of polymer per 100 milliliters of solvent. The specific viscosity is obtained by dividing the difference between the viscosity of the solution and the viscosity of the solvent by the viscosity of the solvent. Unless otherwise noted, the reduced viscosity values herein referred to are measured at a concentration of 0.2 grams of polymer in 100 milliliters of solvent e.g., cyclohexanone, benzene, chloroform, toluene, or other common organic solvents, at 30°C.

Another type of active hydrogen-containing materials useful in this invention are the polymer/polyol compositions obtained by polymerizing ethylenically unsaturated monomers in a polyol as described in British Pat. No. 1,063,222 and U.S. Pat. No. 3,383,351, the disclosures of which are incorporated herein by reference. Suitable monomers for producing such compositions include acrylonitrile, vinyl chloride, styrene, butadiene, vinylidene chloride and other ethylenically unsaturated monomers as identified and described in the abovementioned British Patent and U.S. Patent. Suitable polyols include those listed and described hereinabove and in the British Patent and U.S. Patent. The polymer/polyol compositions can contain from about 1 to about 70 weight percent, preferably about 5 to about 50 weight percent, and most preferably about 10 to about 40 weight percent monomer polymerized in the polyol. Such compositions are conveniently prepared by polymerizing the monomers in the selected polyol at a temperature of 40°C. to 115°C. in the presence of a free radical polymerization catalyst, such as, peroxides, persulfates, percarbonate, perborates and azo compounds. Further details of the compositions and methods of making same are described in the above-mentioned British Patent and U.S. Patent. The resulting composition is believed to be a complex mixture comprising free polyol, free polymer and graft polymer/polyol complexes. Preparation 1 of the British Patent is especially preferred. Polymer/polyol compositions of this type are useful in producing polyurethane article having comparatively high load-bearing properties.

Mixtures of the above active hydrogen-containing compounds can be employed as reactants with the polyisocyanate to form polyurethanes. For example, a mixture of a diol such as propylene glycol, polymer/polyol composition and cyclic ester polymer can be employed.

The polyol or polyol mixture employed in this invention can have hydroxyl numbers which vary over a wide range. In general, the hydroxyl number of the polyols or mixtures thereof, including other crosslinking additives, if employed, can range from about 28 to about 1,000, and higher, preferably from about 100 to about 800.

The hydroxyl number is defined as the number of milligrams of potassium hydroxide required for the complete neutralization of the hydrolysis product of the fully acetylated derivative prepared from 1 gram of polyol or mixtures of polyols with or without other crosslinking additives used in the invention. The hydroxyl number can also be defined by the equation:

$$OH = 56.1 \times 1,000 \times f/m.w.$$

wherein
OH = hydroxyl number of the polyol
$f$ = average functionality, that is average number of hydroxyl groups per molecule of polyol
$m.w.$ = average molecular weight of the polyol.

The exact polyol or polyols employed depends upon the end-use of the polyurethane foam. The molecular weight and the hydroxyl number are selected properly to result in flexible, semi-flexible, or rigid foams. The polyol or polyols including cross-linking additives, if used, preferably possesses a hydroxyl number of from about 200 to about 1,000 when employed in rigid foam formulations, from about 50 to about 250 for semiflexible foams, and from about 45 to about 70 or more when employed in flexible foam formulations. Such limits are not intended to be restrictive, but are merely illustrative of the large number of possible combinations of the polyols that can be employed.

The novel froth compositions can contain a catalyst and/or a crosslinking agent, preferably, so long as its presence will not initiate substantial polymerization prematurely. Other additives for providing special effects, e.g., coloring agent, fillers, etc., can also be included, preferably, so long as they do not initiate substantial polymerization at ambient temperatures or interfere with froth stability.

The liquid phase is preferably substantially chemically stable and, preferably, does not undergo substantial polymerization when the viscosity of a test admixture containing only the non-frothed mixed polyurethane-forming components, surfactants, and any catalysts composing the liquid phase does not reach about 10,000 centipoises in 2,600 seconds when held at a temperature in the range of 24.5° to 25.5°C. The materials are present in the text admixture in the same relative amounts as in the mixture used to produce the froth. The liquid phase can be thus characterized by mixing only those ingredients for about one minute and placing 7.5 ml of it in a Brookfield LVT Viscometer equipped with a jacketed small sample chamber, holding it at a temperature of 24.5° to 25.5°C. and determining its viscosity over the above-specified period of time. The froth is rapidly heat curable when a one-quarter inch thick section of it cures to a tack-free condition within about 30 minutes at about 125°C.

Suitably catalysts include nickel acetylacetonate, more formally known as bis(2,4-pentanedionate) nickel (II), (diacetonitrilediacetylacetonato nickel) and derivatives thereof, such as, diacetonitrilediacetylacetonato nickel, dibenzonitrilediacetylacetonato nickel, bis(triphenylphosphine)-diacetylacetonato nickel and the like. In addition, tin catalysts such as dibutyltin dilaurate can be used advantageously. The amount of such catalyst employed in the liquid phase is preferably in the range of 0.03 to 3.0 weight parts per hundred weight parts of the active hydrogen compound.

Conventional metal catalysts in conventional concentrations also can be used. If desired, the conventional metal catalysts are used in lower than usual concentrations to avoid premature curing. Such catalysts include both inorganic metal compounds and metal compounds which contain organic groups. Particularly useful catalysts are organotin compounds. These catalysts can be used each alone or in mixtures with one or more of the others. Among the organo-tin compounds are stannous acylates, such ad dialkyl tin salts of carboxylic acids, e.g., dibutyltin dilaurate. Other metal salts such as lead octoate and the like can also be employed.

Other but less preferred latent catalysts which can be employed are the metal diorganodithiocarbamates wherein the organo groups can be, for instance, alkyl groups of up to 18 carbon atoms and preferably from 1 to 8 carbon atoms.

In certain systems, especially those having a high hydroxyl number, no catalyst at all is needed. Certain systems containing no catalysts at all are substantially structurally and chemically stable at ambient temperatures yet are curable by the application of heat at temperatures above about 70°C. The hydroxyl number of one such system preferably exceeds 400. Other non-catalyst systems include those where one of the reactants is catalytic, e.g., where the active hydrogen-containing compound is a strong base.

The liquid phase can contain other ingredients, such as, dyes, fillers, pigments, and other materials for providing desired effects. Small amounts of an auxiliary blowing agent can be employed. For example, high boiling fluorocarbons, e.g., boiling above about 40°C. can be used. Very small amounts of water, i.e., insufficient to bring about any substantial gas evolution, can be employed. Specific fluorocarbons include the Ucon fluorocarbons and Freons boiling above about 40°C., for example, 1,1,2-trichloro-1,2,2-trifluoroethane and isomers of tetrachlorodifluoroethane, tetrachloromonofluoroethane and the like. The auxiliary agent, although it is not necessary, can be employed for purposes of providing an added expansion during heat curing in those cases where such added expansion is desired.

The gas phase of the novel froths is most preferably air because of its cheapness and ready availability. However, if desired, other gases can be used which are gaseous at ambient conditions and which are substantially inert or non-reactive with any component of the liquid phase. Such other gases include, for example, nitrogen, carbon dioxide and even fluorocarbons which are normally gaseous at ambient temperatures.

The inert gas is incorporated into the liquid phase by mechanical beating of the liquid phase in high shear equipment such as in a Hobart mixer or an Oakes mixer. The gas can be introduced under pressure as in the usual operation of an Oakes mixer or it can be drawn in from the overlying atmosphere by the beating or whipping action as in a Hobart mixer. The mechanical beating operation preferably is conducted at pressures not greater than 100 to 200 psig. It is significant, however, to note that conventional, readily available, mixing equipment is used and no special equipment is necessary.

The amount of inert gas beaten into the liquid phase should be adequate to provide a froth having a density at ambient atmospheric pressure of less than about 45 percent, preferably less than about 35 percent, of the density of the liquid phase prior to frothing. The mechanical beating is conducted over a period of a few seconds in an Oakes mixer, or of 3 to 30 minutes in a Hobart mixer, or however long it takes to obtain the desired froth density in the mixing equipment employed.

The froth as it emerges from the mechanical beating operation is preferably substantially chemically stable and is structurally stable but easily workable at ambient temperatures, e.g., about 15°C. to about 30°C. The consistency of the froth closely resembles the consistency of aerosol-dispensed shaving cream and it has a density of less than about 45 percent, or preferably less than about 35%, of the density of the liquid phase prior to frothing.

The novel froths of this invention find extensive utility in the production of shaped, foamed articles ranging from flexible foamed articles to rigid foamed articles and all degrees of flexibility and rigidity in between. For example, the novel froths can be molded and subsequently heat cured to form crash padded panels, dashboards, sun-visors, arm-rests and the like for automotive vehicles, airplanes and boats, and can be applied to and cured on the backs of carpeting to provide foam cushion backings or to textile fabrics to provide interlinings for padding and/or thermal insulation purposes.

Because of their substantial chemical and structural stability, the novel froths can be readily shaped by molds or doctor blades. Inasmuch as, in the preferred embodiment, there is no substantial chemical expansion (i.e., expansion due to gas produced in the liquid phase by a chemical reaction) or expansion due to volatilization of a liquid and substantially only thermal expansion taking place during heat curing, dimensional changes are readily predictable and easily controlled. For these reasons, it is also possible to avoid duplication of rough surfaces such as in coating and rough and uneven back sides of carpets. This was not possible through the use of chemically expanded foams.

The present invention now permits the selection of appropriate amounts and types of surfactants which provide an appropriate amount of drainage of the liquid phase, for example, into the interstices of a carpet back. This drainage upon subsequent curing not only locks the foam backing to the carpet but also serves the dual purpose of locking the fibers of the carpet back together. More specifically, this invention also provides a process for providing a second backing on a carpeting material composed of a first backing having a front side faced with fibers which pass through the first backing and which extend beyond the back side to the first backing to mechanically anchor the fibers to the first backing. The process comprises applying to the back side of the first backing and the portion of the fibers extending beyond said back side a substantially uniformly thick layer of a froth of this invention, and curing the froth at a temperature above 70°C. to (a) form a cured polyurethane foam of substantially uniform thickness as an integral second backing on the back side of the first backing and (b) bond the fibers to the first backing. The first backing can be any conventional carpet backing material (e.g., jute or polypropylene) and the fibers can be mechanically anchored to the first backing by any conventional means (e.g., by sewing or needle punching). The fibers can be composed of any conventional carpeting material (e.g., cotton, rayon, wool, nylon, acrylonitrile polymers, vinyl halide polymers, etc.). The fibers can be in any suitable form (e.g., in the form of pile yarns threaded through the first backing and having cut or looped pile faces on the front side of the first backing). The froth can be applied to the first backing by any suitable procedure (e.g., knife coating). The second backing can have any desired thickness (e.g., from one-sixteenth to one-half inch).

The novel froth is readily transportable by conveyor, suitable vehicle or piping from the site of its manufacture to the site of its use in coating the backs of carpeting or fabric, or in forming shaped articles by molding, or in coating wire or other articles, or in encapsulation operations.

The novel block copolymers are also useful as surfactants in the manufacture of polyurethane foams by conventional techniques wherein the reaction mixture is substantially simultaneously foamed and reacted to form the polyurethane. Such systems utilize fast reacting active hydrogen compounds and polyisocyanates and fast catalysts to promote rapid reaction. They also use a blowing agent, such as, water, methylene chloride, or liquefied gases which have boiling points between about −60°F. to about 80°F. Suitable liquefied gases include saturated aliphatic fluorohydrocarbons which vaporize at or below the temperature of the foaming mass. Such gases are at least partially fluorinated and can also be otherwise halogenated. Fluorocarbon blowing agents suitable for use in foaming the formulations of this invention include trichloromonofluoromethane, dichlorodifluoromethane, dichlorofluoromethane, 1,1-chloro-1-fluoroethane, 1-chloro1,1-difluoro, 2,2-dichloroethane, and 1,1,1-trifluoro, 2-chloro-2-fluoro, 3,3-difluoro-4,4,4-trifluorobutane. The amount of blowing agent used will vary with density desired in the foamed product. Usually from 2 to 15 parts by weight of the blowing agent per 100 parts by weight of the reactants are preferred.

The catalysts employed when using the conventional foaming techniques include the conventional catalysts used in producing conventional urethane foams. Such conventional catalysts include N-methyl morpholine, N-ethyl morpholine, hexadecyl dimethylamine, dimethylbenzylamine, N-cocomorpholine, triethylene diamine [1,4-diazobicyclo(2,2,2)-octane], a mixture of 70 wt. percent bis(2-dimethylaminoethyl) ether and 30 wt. % dipropylene glycol, a mixture of 20 wt. percent Tergitol NPX, 40 wt. % $Me_3SiO(Me_2SiO)_5[MeO(C_nH_4O)_5C_3H_6SiMeO]_7SiMe_3$, and 40 wt. percent bis(2-dimethylaminoethyl) ether, and the like. Such catalysts are preferably employed in the mixtures in an amount from 0.1 to 0.5 or 2 weight percent based on the total weight of the reactants. Amines are the preferred catalysts.

The relative amounts of the various components reacted in accordance with the above-described process for producing urethane foams by conventional techniques are not narrowly critical. The active hydrogen compound and the polyisocyanate are present in the foam formulations used to produce such foams in a major amount. The relative amounts of these two components is the amount required to produce the urethane structure of the foam and such relative amounts are well known in the art. The blowing agent, catalyst and surfactants are each present in a minor amount necessary to achieve the function of the component. Thus, the blowing agent is present in a minor amount sufficient to foam the reaction mixture, the catalyst is present in a catalytic amount (i.e., an amount sufficient to catalyze the reaction to produce the urethane at a reasonable rate) and the surfactants are present in a foam-stabilizing amount (i.e., in an amount sufficient to stabilize the foam). Preferred amounts of these various components are given hereinabove.

The siloxane-polyoxyalkylene block copolymer compositions of this invention are excellent stabilizers for rigid, semi-flexible and flexible chemically blown polyurethane foams.

The siloxane-polyoxyalkylene block copolymer compositions of this invention having free hydroxyl groups can be used as polyol reactants having built-in silicone surfactants and can be used as a combined foam stabilizer and active hydrogen reactant. In such cases, the siloxane-polyoxyalkylene block copolymer compositions are used in similar amounts as the active hydrogen reactant relative to the polyisocyanate reactant as described hereinabove.

The following examples illustrate the present invention. In the examples, all parts and percentages are based on weight unless otherwise specified and the following abbreviations are used:

| Abbreviation | Meaning |
|---|---|
| Me | methyl |
| M | $Me_3SiO_{0.5}$ |

| Abbreviation | Meaning |
|---|---|
| D | $Me_2SiO$ |
| D' | $MeSiHO$ |
| Polyol I | A glycerol-started oxypropylene triol having a hydroxyl number of 168. The empirical structure is:<br><br>$\begin{array}{l} H \\ HCO- \\ HCO-[(C_3H_6O)_{5.2}H]_3 \\ HCO- \\ H \end{array}$ |
| Polyol II | A glycerol-started oxypropylene triol having a hydroxyl number of 240. The empirical structure is:<br><br>$\begin{array}{l} H \\ HCO- \\ HCO-[(C_3H_6O)_{3.5}H]_3 \\ HCO- \\ H \end{array}$ |
| Polyol III | A glycerol-started oxyethylene/oxypropylene triol (75/25 wt/% ratio E.O/P.O., respectively) having a hydroxyl number of 184. The empirical structure is:<br><br>$\begin{array}{l} H \\ HCO- \\ HCO-[(C_2H_4O)_{4.7}(C_3H_6O)_{1.2}H]_3 \\ HCO- \\ H \end{array}$ |
| Polyol IV | A glycerol-started oxypropylene triol having a hydroxyl number of 112. The empirical structure is:<br><br>$\begin{array}{l} H \\ HCO- \\ HCO-[(C_3H_6O)_{8.1}H]_3 \\ HCO- \\ H \end{array}$ |
| Polyol V | A sorbitol-started oxypropylene hexa-ol having a hydroxyl number of 490. |
| Polyol VI | A diethylene triamine oxypropylene penta-ol having a hydroxyl number of 475. |
| Polyol VII | A mixture of diols and triols prepared by adding ethylene oxide (14 wt. %) and propylene oxide (86 wt. %) to a mixture of 4 mols of glycerol and 1 mole of dipropylene glycol. The resulting polyol has a hydroxyl number of 46 to 49 and an average molecular weight of about 3700. |
| Mono-ol I | An allyl alcohol-started mono-ol of 2600 calculated molecular weight, the weight ratio of oxyethylene/oxypropylene being 75/25, respectively. The empirical structure is:<br><br>$CH_2=CHCH_2O(C_2H_4O)_{43}(C_3H_6O)_{11}H$ |

| Abbreviation | Meaning |
|---|---|
| | —Continued |
| TDI | A mixture of 80 wt. % 2,4-tolylene diisocyanate and 20 wt. % 2,6-tolylene diisocyanate. |
| PAPI | Polyisocyanate having the average formula: |

$$\left[ \begin{array}{c} NCO \\ \phantom{x}\phantom{x}CH_2- \end{array} \right]_x$$

and having an isocyanate equivalent of about 133.5, a viscosity of about 250 cps at 25°C., a specific gravity of about 1.2 (20/20°C.) and a minimum NCO content of about 31% by weight.

| | |
|---|---|
| Catalyst I | Triethylene diamine [1,4-diazobicyclo-(2,2,2)-octane] made by Houdry Process and Chemical Company. |
| Fluorocarbon I | Fluorotrichloromethane. |

EXAMPLE 1

A solution of Polyol I (100 g., 0.30 equivalent of OH) in 100 milliliters of toluene was heated to 85°C. in an atmosphere of nitrogen. Stannous octoate (0.5 g.) was added and heating continued to 105°C. A methyl hydrogen polysiloxane having the average formula $Me_3SiO(Me_2SiO)_{7.2}(MeHSiO)_{3.4}SiMe_3$ (23 g., 0.09 equivalents of SiH) was added dropwise over a period of 40 minutes. Then the reaction mixture was heated at 105°C. for 7 hours. After this period all silanic hydrogen had reacted. Solvent was removed by sparging with nitrogen at 115°C. The product was a clear, colorless siloxane-polyoxypropylene block copolymer containing 19 percent siloxane and having a viscosity of 2,760 centistokes at 25°C. This product is referred to hereinafter as "composition H."

EXAMPLE 2

By the general procedure of Example 1 a methyl hydrogen polysiloxane having the average formula given in Example 1 (32.9 g., 0.13 equivalents of SiH) was added to Polyol III (150 g., 0.49 equivalents of OH). The product siloxane-polyoxyethyleneoxypropylene block copolymer was a pale yellow liquid having a viscosity of 2,245 centistokes at 25°C. and a one percent aqueous cloud point of 79°C. By the phthalation method, the percent hydroxyl was found to be 3.87. This product is referred to hereinafter as "composition N."

EXAMPLE 3

Methyl isocyanate (16 g., 0.28 mole) was added dropwise at ambient temperatures to the product of Example 2 (75 g., 0.22 equivalent of OH) in 65 ml toluene. Over a 1-¼ hour addition period the temperature rose from 25°C. to a maximum of 40°C. The reaction mixture was stirred for a total of 7 hours. Solvent was removed by sparging to 115°C. with nitrogen. The product was N-methyl carbamate-capped siloxane-polyoxyethyleneoxypropylene copolymer. The product was a clear, pale yellow liquid with a viscosity of 3,545 centistokes at 25°C. The one percent aqueous cloud point of this copolymeric product was 44°C. By the phthalation method the hydroxyl content of this product was found to be 0.4 percent, showing that the starting copolymer had been about 94 percent capped. This product is referred to hereinafter as "composition O."

EXAMPLE 4

The siloxane-polyoxyalkylene block copolymer compositions in the following Table I below using the siloxane and polyoxyalkylene reactants also identified in the table were synthesized by the general procedure of Example 1. Compositions A, B, C and D are not part of this invention but are for illustrative purposes only.

The terminal groups on the oxyalkylene chains of compositions O and P were N-methyl carbamate groups, —OOCNMe, and the terminal groups on the oxyalkylene chains of all other compositions were hydroxyl groups, —OH. The one percent aqueous cloud point of compositions N and O were 79°C. and 44°C., respectively. The properties of the compositions are also given in Table I. The froth densities were determined in accordance with Examples 5 and 6 and it is clear from an inspection of Table I that the undiluted froth densities of compositions E, L and M are strikingly lower than the undiluted froth densities of compositions A through D.

TABLE I

| Composition | Reactants $MD_cD'_dM$ | | | | Polyol | | Visc cstk 25°C | Wt. -% Siloxane | Composition Properties Mole ratio Polyol to Siloxane | Crosslink Density— Conc.* | Undiluted Froth Density lbs/ft.** |
|---|---|---|---|---|---|---|---|---|---|---|---|
| | g. | c | d | Moles SiH | g | Type | Moles OH | | | | | |
| A | 4.5 | 20 | 3.5 | 0.008 | 300 | I | 0.90 | — | 1.5 | 137 | 5.3 | 31 |
| B | 9.0 | 20 | 3.5 | 0.016 | 300 | I | 0.90 | — | 2.9 | 65.5 | 10.2 | 21 |
| C | 9.0 | 72 | 5.0 | 0.008 | 300 | I | 0.90 | — | 2.9 | 188.1 | 14.5 | 35 |
| D | 13.5 | 7.2 | 3.4 | 0.052 | 300 | I | 0.90 | 305 | 4.3 | 19.6 | 14.6 | 16.6 |
| E | 27.0 | 7.2 | 3.4 | 0.104 | 300 | I | 0.90 | 372 | 8.3 | 9.8 | 28.2 | 10.7 |

TABLE I—Continued

| Compo-sition | Reactants MD_cD'_dM g. | c | d | Moles SiH | Polyol g | Type | Moles OH | Visc cstk 25°C | Wt. -% Siloxane | Composition Properties Mole ratio Polyol to Siloxane | Crosslink Density—Conc.* | Undiluted Froth Density lbs/ft.** |
|---|---|---|---|---|---|---|---|---|---|---|---|---|
| F | 40.9 | 7.2 | 3.4 | 0.157 | 300 | I | 0.90 | 527 | 12.3 | 6.5 | 41.8 | — |
| G | 28.6 | 7.2 | 3.4 | 0.110 | 150 | I | 0.45 | 1110 | 16.0 | 4.6 | 54.4 | — |
| H | 23.5 | 7.2 | 3.4 | 0.090 | 100 | I | 0.30 | 2760 | 19.0 | 3.8 | 64.6 | — |
| I | 19.1 | 2.2 | 4.2 | 0.14 | 100 | II | 0.42 | — | 16.0 | 4.2 | 67.2 | — |
| J | 23.5 | 7.2 | 3.4 | 0.090 | 100 | II | 0.42 | 604 | 19.0 | 5.3 | 64.6 | — |
| K | 33.3 | 7.2 | 3.4 | 0.10 | 100 | II | 0.42 | 2105 | 25.0 | 4.8 | 85.0 | — |
| L | 4.5 | 23 | 8.9 | 0.017 | 100 | I | 0.30 | — | 4.3 | 52.6 | 38.3 | 12.1 |
| M | 13.5 | 44 | 15.2 | 0.048 | 300 | I | 0.90 | — | 4.3 | 97.1 | 65.4 | 10.9 |
| N | 32.9 | 7.2 | 3.4 | 0.13 | 150 | III | 0.49 | 2245 | 18 | 4.3 | 61.2 | — |
| O | Composition N capped with MeNCO | | | | | | | 3545 | 16 | 4.3 | 61.2 | — |
| P | Composition H capped with MeNCO | | | | | | | 6110 | 16 | 3.8 | 64.6 | — |

* Density of silicon valences per siloxane block bonded to polyoxyalkylene blocks times the concentration of siloxane in the composition or in simpler terms the product of y and the weight % siloxane in the composition.
** Froth densities of the undiluted compositions see Table II.

EXAMPLE 5

The siloxane-polyoxypropylene block copolymer of Example 1 (composition H) (10.5 g.) was diluted with additional Polyol I (189.5 g.) so that the siloxane content was one percent. This diluted product was frothed in Hobart mixer by stirring with a metal whip at speed number 2 for 10 minutes. The froth obtained was fine-celled, having the consistency of shaving lather, and had a density of 13.6 lbs./ft.³. A 75 milliliter sample of this froth was placed in a 100 milliliter glass beaker. Liquid drainage at the bottom of the beaker was not detectable for at least 30 minutes. Without addition of the siloxane surfactant, a froth could not be obtained with this polyol.

The particular polyol frothed is useful as a component of a polyurethane foam formulation (see Example 7 below). It has been found that surfactants that provide a stable froth of Polyol I also stabilize polyurethane foams based on this polyol (see Examples 4 and 7).

EXAMPLE 6

The crosslinked copolymers of Example 4 were used to froth various polyols and, in one case, a mono-ol. In some cases the copolymer was added to the polyol to be frothed; in others the copolymer was used in situ, i.e., no more polyol was added prior to frothing. Degree of dilution, if any, is shown by comparison of the weight percent of siloxane in the copolymer (see Example 4) with the weight percent of siloxane of the material at the time of frothing (see Table II). Good correlation has been established between the effectiveness of siloxanepolyoxyalkylene copolymers in frothing polyols alone and in frothing the same polyols containing polyisocyanate and catalyst. A copolymer which performed well in a particular polyol also was substantially as effective in the same polyol containing the other ingredients of the polyurethane-forming mixture to be frothed. The following Table II shows froth densities obtained, using the frothing procedure of Example 5, with various siloxane-polyoxyalkylene copolymer compositions prepared in Example 4.

TABLE II

| Com-po-sition | Wt.-% Siloxane in the Composition | Polyol Frothed | Wt.-% Siloxane in the Froth | Froth Density lbs./ft.³ |
|---|---|---|---|---|
| A | 1.5 | I | 1.5 | 31 |
| B | 2.9 | I | 2.9 | 21 |
| C | 2.9 | I | 2.9 | 35 |
| D | 4.3 | I | 4.3 | 16.6 |
| E | 8.3 | I | 4.3 | 11.8 |
| E | 8.3 | I | 8.3 | 10.7 |
| F | 12.3 | I | 4.3 | 10.4 |
| G | 16.0 | IV | 0.9 | 13.8 |
| G | 16.0 | II | 1.0 | 14.1 |
| G | 16.0 | I | 1.0 | 12.7 |
| G | 16.0 | I | 4.3 | 10.4 |
| H | 19.0 | I | 1.0 | 13.6 |
| I | 16.0 | I | 1.7 | 13.9 |
| J | 19.0 | I | 1.0 | 15.7 |
| K | 25.0 | I | 1.3 | 14.5 |
| L | 4.3 | I | 4.3 | 12.1 |
| M | 4.3 | I | 4.3 | 10.9 |
| O | 16 | Mono-ol I | 1.0 | 21 |
| P | 16 | I | 0.9 | 13.6 |

Copolymer compositions of this invention (compositions E through P) provided very stable froths with respect to aging to ambient temperatures. The test used was to place about 100 milliliters of a freshly made froth in a 100-milliliter beaker and determine the time before obvious separation of liquid could be observed near the bottom. Typically, for copolymer compositions of this invention, times were 15 minutes or more, in some cases 30 minutes or more. Even though bubble coalescence may have been occurring within these time periods, in many instances at the point when liquid drainage first was observed, the froths still consisted of 50 to 150 cells per inch. The degree of froth stability is important in operations in which uncured froth is applied to various substrates, as by knife-coating. Relatively long periods of froth stability provide the manufacturer more latitude in his operations.

Compositions A through D, which are not substantially cross-linked, provided comparatively poor froth stability, separation of liquid being observed within less than 15 minutes. Also, these compositions gave substantially higher froth densities than copolymer compositions of this invention.

EXAMPLE 7

Frothed flexible polyurethane foams were prepared using as stabilizers, compositions H, M and P of Example 4. The following weights of ingredients were used:

| | Parts by Weight | | |
|---|---|---|---|
| Stabilizer composition | H | M | P |
| Polyol I | 200 | — | 200 |
| Stabilizer Composition M | — | 217.5 | — |
| Stabilizer Compositions H and P | 11.0 | — | 11.0 |
| NIAX Catalyst D-22 | 0.56 | 0.72 | 0.28 |
| TDI | 52.0 | 56.6 | 52.0 |

Froths were made by the following procedure:

Polyol, stabilizer compositions, tin and isocyanate were frothed from 5 to 7 minutes, using a metal whip with a Hobart blender at speed number 2. Part of the resultant froth was placed in a paper cup and density determined. Another portion of the froth was knifed within a shallow steel mold 5 × 7 × ¼ inch deep and resting upon paper. The froth was cured for 10 minutes at 120°C. Good flexible foams were obtained with each stabilizer composition. The cured foams had the following properties:

|  | H | M | P |
|---|---|---|---|
| Cells per inch | 120–130 | 50–60 | 40–50 |
| Density,lbs./ft.³ | 18 | 18 | 16 |

All foams had good cell and skin uniformity and had very little tack. Stabilizer compositions H and P demonstrate the good efficacy of hydroxy and carbamate-capped copolymers, respectively, used as additives at relatively low concentrations. Stabilizer composition M demonstrates the use of an in situ type, i.e., the stabilizer is built into the polyol and the whole system frothed.

EXAMPLE 8

This example demonstrates the effect of crosslink density, or SiH functionality (d), in this series on froth density. The stabilizer compositions were used in situ, i.e., no further adjustment in siloxane to polyol ratio was made prior to frothing. The frothing procedure generally was the same as in Example 5, with the exception that no additional polyol was incorporated.

| Composition | Wt. % Siloxane Reacted with Polyol I and in the Frothing System | SiH Functionality (d) of Hydrosiloxane Intermediate | Siloxane Crosslink Density Concentration* | Froth Density lbs.ft.³ |
|---|---|---|---|---|
| D | 4.3 | 3.4 | 14.6 | 16.6 |
| L | 4.3 | 8.9 | 38.3 | 12.1 |
| M | 4.3 | 15.2 | 65.4 | 10.9 |

*See Table I

These results illustrate that, where the same polyol is frothed without other additives, and at the same percent siloxane, the froth density decreases substantially as copolymer branching and crosslinking increases.

EXAMPLE 9

This example demonstrates that, for copolymer compositions based on the same siloxane and polyol intermediates, as the cross-link density-concentration increases, the copolymer viscosity increases and the froth density decreases. Compositions E and F of Example 4 were diluted with the necessary amounts of polyol to give the same percent concentration of siloxane (4.3) as was present when composition D was used directly without dilution (i.e., as an in situ type). For each test, 200 grams of composition plus polyol (when added in the cases of E and F) were frothed by the procedure of Example 5. The following table summarizes the results:

| Composition | Viscosities of Compositions before Dilution cstk at 25°C | Wt. % Siloxane in the Composition before Dilution | Cross-link Density— Concentration | Normalized Wt. % Siloxane in the Frothing Mixture | Froth Density lbs./ft.³ |
|---|---|---|---|---|---|
| D | 305 | 4.3 | 14.6 | 4.3 | 16.6 |
| E | 372 | 9.3 | 28.2 | 4.3 | 11.8 |
| F | 527 | 12.3 | 41.8 | 4.3 | 10.4 |

EXAMPLE 10

Rigid chemically blown polyurethane foams were prepared with compositions J and N of Example 4 used as surfactants (foam stabilizers). The following foam formulation was used:

|  | Grams |
|---|---|
| Polyol V | 85.0 |
| Polyol VI | 15.0 |
| Fluorocarbon I | 40.0 |
| Catalyst I | 1.2 |
| N,N,N',N'-tetramethyl-1,3-butanediamine | 0.4 |
| PAPI (Polyisocyanate) | 124.0 |
| Stabilizer Composition | 1.5 |

The polyols were blended and mixed with the fluorocarbon, then the stabilizer composition and the amines were added and the reactants were stirred for 10 seconds on a drill press. The polyisocyanate was added and mixing was continued for an additional 10 seconds. The reaction mixture was poured into an 8 × 8 × 6 × box, was allowed to foam and then was cured for 10 minutes at 120°C. Rigid foams were obtained which had the following properties:

|  | Compositions | |
|---|---|---|
|  | J | N |
| Cells per inch | 25 | 55 |
| Density, lbs./ft.³ | 1.39 | 1.93 |
| Uniformity | good | good |

Using the same formulation without surfactant, a foam was obtained which had a very coarse, irregular cell structure, and a higher density than that of the foam prepared in the presence of surfactants of this invention.

Example 11

A semi-flexible, chemically blown polyurethane foam was prepared using copolymer O of Example 4. The following foam formulation was used:

|  | Grams |
|---|---|
| Polyols II and IV blended to a hydroxyl number of 175 | 100.0 |
| Water | 1.0 |
| Catalyst I | 0.30 |
| Stannous octoate | 0.20 |
| Stabilizer Composition O | 4.0 |
| Dimethylsilicone oil Me₃SiO(Me₂SiO)ₓSiMe₃) having a viscosity of 350 centistokes at 25°C.* | 1.0 |
| TDI | 33.1 |

*Used to provide a more open-celled foam.

The polyols were weighed into a Lily cup, then a mixture of the stabilizer composition and the dimethylsilicone oil was added, followed by a mixture of the water and Catalyst I. A baffle was inserted and the ingredients stirred for one minute at 1,000 r.p.m. Then the stannous octoate was added by syringe, mixing was continued for 10 seconds, the isocyanate was then added and mixing was continued for 10 more seconds. The contents were poured into an 8 × 8 × 6 × box, were allowed to rise and were cured at 120°C. for 10 minutes. A uniform foam was obtained which had 30–35 cells per inch and an excellent skin. The foam appeared to be suitable for applications such as crash padding or gasketing material.

EXAMPLE 12

Flexible CO₂/fluorocarbon-blown polyurethane foams were prepared using compositions E and J of Example 4 separately as stabilizers. The following foam formulation was:

| | Parts/100 Parts of Poylol by Weight | Grams |
|---|---|---|
| Polyol VII | 100.0 | 350.0 |
| Water | 3.5 | 12.25 |
| N-ethyl morpholine | 0.2 | 0.70 |
| Catalyst I | 0.3 | 1.05 |
| Fluorocarbon 1 | 8.0 | 19.0 (ml) |
| Stannous octoate | 0.35 | 0.98 (ml) |
| Composition E | 2.0 | 7.0 |
| or | | |
| Composition J | 1.0 | 3.5 |
| TDI | 43.1 | 151.0 |

The polyol was weighed into a Lily cup and the stabilizer composition stirred into it. The water, N-ethyl morpholine and Catalyst I were premixed and with the fluorocarbon were added to the cup and the mixture was stirred about 15 seconds. The stannous octoate was added and mixed for 8 seconds, then the TDI was added and mixed for 7 seconds. The reaction mixture was poured into a 12 × 12 × cardboard box, allowed to rise, then cured 15 minutes at 120°C. The following excellent foam properties were obtained:

| Composition | Rise Inches | Top Collapse Inches | Cells per Inch | Uniformity |
|---|---|---|---|---|
| E | 7.4 | 0.1 | 20–25 | Good |
| J | 7.9 | 0 | 30–35 | Good |

EXAMPLE 14

A solution of a hydrosiloxane of the composition Me$_3$SiO(Me$_2$SiO)$_{16}$(MeHSiO)$_{6.6}$SiMe$_3$ (17.5 g., 0.066 equivalent of SiH), a polypropylene glycol having an average molecular weight of 1000 (75 g., 0.15 equivalent of OH), dibutyltin dilaurate (0.2 g.) and xylene as solvent were heated at reflux. After all silanic hydrogen had reacted, the solvent was removed by distillation at reduced pressure. The colorless, liquid product was a crosslinked siloxane-polyoxypropylene polyol copolymer composition containing about 18.9 percent siloxane based on the total weight of the composition, having a mole ratio of polyoxypropylene to siloxane of about 7.5 and a density concentration as defined in Table I of about 125.

EXAMPLE 15

This example demonstrates the effectiveness of copolymers of this invention in stabilizing a plasticizer for polyvinyl chloride. The compositions of this invention are good froth stabilizers for dipropyleneglycol di(epoxyoleate) (XP-2007) and certain other plasticizers and are effective froth stabilizers for polyvinyl chloride plastisols based on these plasticizers. Two mixtures were prepared each containing 200 weight parts of the plasticizer (XP-2007) and 12 weight parts of composition H and K, respectively. The mixtures were frothed for the times indicated below in a Hobart mixer at speed No. 2 using a metal whisk. After the 15-minute period of frothing, 500 milliliters of froth were placed into a 500-milliliter graduated cylinder and foam properties determined at that point and after the aging periods shown below. The froths obtained had the following properties:

| | Mins. of Frothing | Aging, Mins. of Frothing | H | K |
|---|---|---|---|---|
| Density, lbs./ft.$^3$ | 5 | — | 20.5 | 23.9 |
| | 10 | — | 15.2 | 17.8 |
| | 15 | — | 14.5 | 17.0 |
| Cells per inch | 15 | — | 160 | 140 |
| Top collapse after aging, ml. | — | 10 | 0 | 0 |
| | — | 20 | 0 | 0 |
| | — | 30 | 0 | 0 |
| Cells per inch after aging | — | 10 | 110 | 110 |
| | — | 20 | 90 | 90 |
| | — | 30 | 90 | 90 |

The composition prepared in Example 14 was mixed in the amount of 4 wt. parts with 200 wt. parts of the plasticizer identified above and was frothed for 8 minutes by the procedure described above. The resulting froth had a density of 15 lbs./ft.$^3$.

The partially crosslinked siloxane-polyoxyalkylene block copolymer compositions of this invention contain polyfunctional siloxane blocks, polyfunctional polyoxyalkylene blocks and monofunctional blocks from the class consisting of monofunctional siloxane blocks and monofunctional polyoxyalkylene blocks. The siloxane blocks are linked to the polyoxyalkylene blocks by silicon to oxygen to carbon ( ≡SiOC≡ ) linkages and are comprised of siloxane units each having one to three monovalent hydrocarbon groups bonded to silicon thereof. The polyfunctional siloxane blocks have an average of at least two valences of silicon per polyfunctional siloxane block combined in said linkages and the monofunctional siloxane blocks, if any, have one valence of silicon per monofunctional siloxane block combined in said linkages. The polyoxyalkylene blocks are comprised of oxyalkylene units. The polyfunctional polyoxyalkylene blocks have an average of at least two valences of carbon per polyfunctional polyoxyalkylene block combined in said linkages and the monofunctional polyoxyalkylene blocks, if any, have one valence of carbon per monofunctional polyoxyalkylene block combined in said linkages. The total of valences, bonded via said linkages to polyfunctional polyoxyalkylene blocks, of an average polyfunctional siloxane block plus the valences, bonded via said linkages to polyfunctional siloxane blocks, of an average polyfunctional polyoxyalkylene block is more than 4 but less than 5, for example, about 4.1 to about 4.9, more specifically, about 4.3 to about 4.7. The remaining valences, if any, of said average polyfunctional siloxane block are combined through said linkages to monofunctional polyoxyalkylene blocks and the remaining valences, if any, of said average polyfunctional polyoxyalkylene block are combined through said linkages to monofunctional siloxane blocks. Some of the polyfunctional siloxane blocks and/or polyoxyalkylene blocks are crosslinking blocks and the monofunctional siloxane blocks, if any, are noncrosslinking or branching blocks.

What is claimed is:

1. Composition consisting essentially of partially crosslinked siloxane-polyoxyalkylene block copolymers wherein the polyoxyalkylene blocks are linked to the siloxane blocks by silicon to oxygen to carbon linkages, the carbon of each said linkage being bonded only to the oxygen of said linkage, hydrogen and carbon, the siloxane blocks are comprised of siloxane units each having one to three monovalent hydrocarbon groups having from 1 to 18 carbon atoms bonded to the silicon thereof and have an average of at least two valences of silicon per siloxane blocks combined in said linkages, a portion of said polyoxyalkylene blocks are crosslinking blocks having at least two valences of carbon per polyoxyalkylene block combined in said linkages and comprise polyoxyalkylene units, and a portion of said polyoxyalkylene blocks comprise oxyalkylene units and contain at least one group selected from the class consisting of hydroxy, —OR, —OOCNHR, and —OOCR groups wherein R is monovalent hydrocarbon having 1 to 18 carbon atoms free of aliphatic unsaturation, the average number of said silicon valences per average siloxane block combined with said polyoxyalkylene blocks time the weight percentage of said siloxane blocks in said composition, based on the total weight of siloxane blocks and polyoxyalkylene blocks in the composition, is about 20 to about 150, and the ratio of the number of said polyoxyalkylene blocks to said siloxane blocks is about 3:1 to about 100:1.

2. Composition as claimed in claim 1 wherein the polyoxyalkylene blocks are composed of carbon, oxygen and hydrogen and the ratio of polyoxyalkylene blocks to siloxane blocks is 3:1 to 15:1.

3. Composition as claimed in claim 1 wherein said siloxane blocks have the formula:

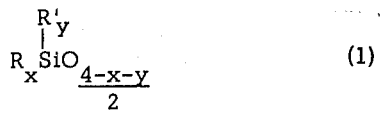

(1)

wherein R is a monovalent hydrocarbon group free of aliphatic unsaturation and having 1 to 18 carbon atoms, R' is oxygen bonding silicon to the siloxane block to carbon of the polyoxyalkylene block, $x$ is an integer of 1 to 3 inclusive, $y$ is an integer of 0 to 2 inclusive, and $x+y$ is an integer of 1 to 3 inclusive, said siloxane block having an average of at least two R' groups per block, and each of said cross-linking polyoxyalkylene blocks is represented by the formula:

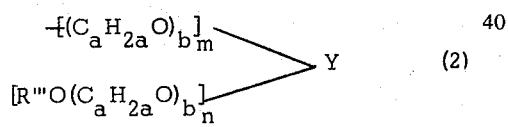

(2)

wherein Y is a polyvalent hydrocarbon group free of aliphatic unsaturation and having 2 to 18 carbon atoms and a valence of $m+n$, R''' is selected from the class consisting of hydrogen, RNHCO—, RCO— and R, $a$ is an integer of at least 2, $b$ is an integer of at least 1, $m$ is an integer of at least 2, $n$ is an integer of 0 to 12, and $m+n$ is an integer of 2 to 14 and each of said branching blocks is represented by the formula:

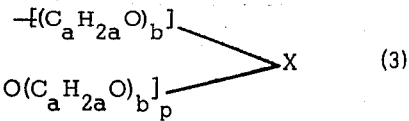

(3)

wherein R''', $a$ and $b$ are as defined above, $p$ is an integer of at least 1, and X is a polyvalent hydrocarbon free of aliphatic unsaturation, having 2 to 18 carbon atoms, and having a valence of $p+1$.

4. Composition as claimed in claim 3 wherein R''' is hydrogen.

5. Composition as claimed in claim 3 wherein R''' is —OCNHR.

6. Composition as claimed in claim 4 wherein, in formula (2), $m+n$ is 3 and Y is

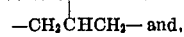

and, in formula (3),

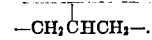

7. Composition as claimed in claim 3 wherein said crosslinking polyoxyalkylene blocks are represented by the formula —$(C_aH_{2a}O)_bC_aH_{2a}$—.

8. Composition as claimed in claim 5 wherein, in formula (2), $m+n$ is 3 and Y is

and, in formula (3), $m+n$ is 3 and X is

* * * * *

UNITED STATES PATENT OFFICE
CERTIFICATE OF CORRECTION

Patent No. 3,867,420      Dated Feb. 18, 1975

Inventor(s) E. L. Morehouse et al

It is certified that error appears in the above-identified patent and that said Letters Patent are hereby corrected as shown below:

Col. 4, line 51, after "siloxane", "moleculesor" should read "molecules or"

Col. 4, line 56, "hydrosiloxane" should be "hydrosiloxanes".

Col. 11, line 3, "anad" should be "and".

Col. 12, line 12, "115°C" should be "150°C".

Col. 13, line 46 "ad" should be "as".

Col. 15, line 7, after "coating", "and" should be "the".

Col. 15, line 59, after "and", "fast catalysts" should be "fast acting catalysts".

Col. 23, line 38, Last Column Heading "lbs.ft.$^3$" should be "lbs./ft.$^3$".

Col. 23, line 67, Column Headings, delete "Concen-" ; "Frothing" should be "Concen-" ; "Density" should be "Frothing" ; insert "Density" under "Froth".

Col. 24, line 20, after "6" delete "x".

Col. 24, line 59, after "6" delete "x".

Col. 25, line 18, delete "x" appearing before "cardboard".

Col. 25, line 27 "Example 14" should be "Example 13".

UNITED STATES PATENT OFFICE
CERTIFICATE OF CORRECTION

Patent No. 3,867,420    Dated Feb. 18, 1975

Inventor(s) E. L. Morehouse et al

It is certified that error appears in the above-identified patent and that said Letters Patent are hereby corrected as shown below:

Col. 25, line 43 "Example 15" should be "Example 14".

Col. 25, lines 53-54, after "parts of", "composition" should be "compositions".

Col. 26, line 12, after "prepared in", "Example 14" should be "Example 13".

Col. 27, line 11, after "blocks", "time" should be "times".

Col. 28, line 27, after "in formula (3)," insert " p is 2 and X is".

Signed and Sealed this fourth Day of May 1976

[SEAL]

Attest:

RUTH C. MASON
Attesting Officer

C. MARSHALL DANN
Commissioner of Patents and Trademarks